US008957533B2

(12) United States Patent
Cavazos et al.

(10) Patent No.: US 8,957,533 B2

(45) Date of Patent: Feb. 17, 2015

(54) SELF-CONTAINED BISTABLE INFORMATION DISPLAY WITH MECHANICAL ACTIVATION

(75) Inventors: Marcel Montemayor Cavazos, Guadalupe (MX); Karla Morena Guajardo Gonzalez, Monterrey (MX); Alberto Sanchez Garza, Guadalupe (MX); Carlos Alberto Gutierrez Ordonez, Escobedo (MX); Daniela Montserrat Portilla Gonzalez, Monterrey (MX); Lucy Adriana Boldo Casanova, Monterrey (MX)

(73) Assignee: Schneider Electric USA, Inc., Palatine, IL (US)

( * ) Notice: Subject to any disclaimer, the term of this patent is extended or adjusted under 35 U.S.C. 154(b) by 219 days.

(21) Appl. No.: 13/529,056

(22) Filed: Jun. 21, 2012

(65) Prior Publication Data

US 2013/0340304 A1 Dec. 26, 2013

(51) Int. Cl.
*H02K 7/18* (2006.01)

(52) U.S. Cl.
USPC .......................................... 290/1 R; 290/1 C

(58) Field of Classification Search
USPC ........... 359/290; 310/50, 53, 156, 339, 254.1, 310/75 B; 290/1 R, 1 A, 1 E, 1 C, 5
See application file for complete search history.

(56) References Cited

U.S. PATENT DOCUMENTS

| | | | | |
|---|---|---|---|---|
| 5,408,187 | A | 4/1995 | Mackie | |
| 5,475,371 | A | 12/1995 | Dunk et al. | |
| 6,049,143 | A | 4/2000 | Simpson et al. | |
| 6,348,908 | B1 | 2/2002 | Richley et al. | |
| 6,407,483 | B1 | 6/2002 | Nunuparov et al. | |
| 6,552,884 | B2 | 4/2003 | Kim et al. | |
| 6,842,166 | B2 | 1/2005 | Hasegawa et al. | |
| 6,933,655 | B2 | 8/2005 | Morrison et al. | |
| 7,049,708 | B2 * | 5/2006 | Hartman et al. | 290/1 A |
| 7,330,174 | B2 | 2/2008 | du Breuil | |
| 2007/0076325 | A1 | 4/2007 | Radivojevic et al. | |
| 2007/0188955 | A1 | 8/2007 | Elms | |
| 2007/0247768 | A1 | 10/2007 | Meehleder et al. | |
| 2009/0140871 | A1 | 6/2009 | Titus | |

FOREIGN PATENT DOCUMENTS

DE 102007058751 A1 4/2009

* cited by examiner

*Primary Examiner* — Tuyen Tra
(74) *Attorney, Agent, or Firm* — Locke Lord LLP

(57) ABSTRACT

A self-powered, self-contained, signage device includes a bistable display with its state-change power received from an actuator handle or pushbutton attached to a mechanically activated generator integral to the display. The device may be integrated into actuating members for various equipment types thereby providing a highly visible status indication of equipment operations.

12 Claims, 3 Drawing Sheets

SELF-CONTAINED BISTABLE INFORMATION DISPLAY WITH MECHANICAL ACTIVATION

BACKGROUND OF THE INVENTION

1. Field of the Invention

The present invention relates generally to electro-mechanically activated bistable information displays such as may be associated with manual operation. The present disclosure relates more particularly to signage and indicators of status for electrical distribution equipment operated integrally with operation of the equipment.

2. Discussion of the Known Art

In the present art, signage is know to be static, i.e. "printed," whose meaning herein includes embossed or the like "permanently" without need for electrical power, or it is actively powered and controlled, i.e. electronic display with continuously provided display signal and electrical power. Bistable displays such as the electronic paper displays are known in the art and can hold an image indefinitely with an electrical pulse only needed to change the displayed indicia. Bistable displays are currently known to be utilized with on-board power sources such as batteries or power supplies. Bistable displays are also currently known to be utilized with apparatus such as thumb drives carrying a manually operated power source activated by shaking the thumb drive.

Static signage may suffer from lack of visual clarity, brightness, contrast, color, legibility, etc. as it ages and is further subject to degradation of the printed image by physical forces such as fading, abrasion, erosion, or the like. Movable mechanical signage such as known in the electrical distribution equipment art where an indicia panel moves with the throw of a switch handle into a viewing window cut into the equipment enclosure can suffer from the degradation of mechanical linkage. Opening of the enclosure envelope exposes the inside of the enclosure to environmental forces and the outside of the enclosure, and operators, to electrical forces inside the enclosure. Electrical and electronic displays suffer from the further disadvantage of being relatively expensive and needing a ready external power source which must be supplied, maintained, recharged, or the like.

SUMMARY OF THE INVENTION

Due to the above limitations a self-contained device providing static indicia to indicate the status of a variety of associated apparatus conditions would be welcome in the art. For example, highly visible indications of operating conditions, such as ON or OFF, of apparatus such as an electrical distribution safety switch, with the indications located on or near the operating handle of the switch, would be a boon to safety in that industry.

To that end, aspects of the present invention can provide self-powered, self-contained signage having a bistable information display with an integral, mechanically activated, generator. Electro-mechanical activation of the generator tied to manipulation of the apparatus actuators, such as push buttons or handles, can provide state-change power to the bistable display indicating their status. Mechanical activation may be accomplished manually or through mechanical operation from powered manipulating means within the scope of the invention.

Several benefits of the present invention would include improved operator safety from static signage/operating indicia displays without reliance on purely mechanical displays, removal of the need for opening viewing windows in electrical equipment enclosures, and decreased wiring and power requirement from electrical displays, at a very reasonable product cost.

In some aspects the invention may provide a self-contained information display device for status communication, comprising a bistable display electrically attached to a mechanically powered electrical generator allowing operation of the mechanically powered generator to cause the bistable display to change state.

As commonly understood, a bistable display can be defined as a matrix-controlled display whose surface can store information. Bistable display elements need only be addressed once to assure that they are on or off. The display is static, i.e. persistent without need for an electronic refresh. The Bistable display member itself may typically be an electronic paper display including any necessary electronic substrate to control or dictate the indicia. It will be appreciated that a bistable display of the present invention could be a two-state indicator, e.g. displaying ON or OFF, or with suitable input and electronics could be a multistate display wherein the electronic paper can display a variety of selectable display choices, i.e. one or more the display states may be changed, and the on-board mechanical generator merely toggles the state of the display from one state to another.

The self-contained information display may for example be controlled, i.e. operated by, a push button or a handle, which may be either integral with, or attached to, an actuator causing movement of the electrical generator piece needed to generate the operating current. In a readily understood example, the bistable display changes state to give a status of operations of an electrical distribution device. The self-contained information display device is integrated into the handle assembly of the operating handle of an electrical safety switch used to turn the switch off and on (i.e. open and close the contacts) from outside of a metal enclosure surrounding the contacts. The mechanical operation of the handle whether in a rotary or linear fashion, will cause the on-board mechanical generator to develop a charge and hence cause the bistable display integrated into the handle to toggle the display to the corresponding "OFF" or "ON" status of the contacts. In other examples, the generator may be operated and caused to toggle the display by operating a pushbutton intended to toggle an operation or status of the electrical equipment.

It will be appreciated that all additional electrical devices of the self-contained display, such as any necessary transformers, and electronic devices such as a display substrate, components for production or storage of additional display signals, appropriate memory devices, and the like, are contemplated to be present as needed or desired.

It will further be appreciated that operation of the handle or push button need not merely change the state of the bistable display but, per the above example, will usually cause actions to happen in the underlying equipment. The generator of the display device could thus be integrated into the operation of the underlying equipment or it could be used merely to change the status indication of the bistable display.

Some aspects of the invention may be particularly suited or adaptable merely for self-powered and self-contained information display without integration into selectable equipment operations. For example it is contemplated that the present invention can be used as an exterior blankable information display panel capable of receiving status messages on the operation of enclosed equipment wherein the status messages will persist until removed by the operator.

BRIEF DESCRIPTION OF THE DRAWINGS

The foregoing and other advantages of the present disclosure will become apparent upon reading the following detailed description and upon reference to the drawings of which.

DETAILED DESCRIPTION OF THE PREFERRED EMBODIMENTS

Figure 1:
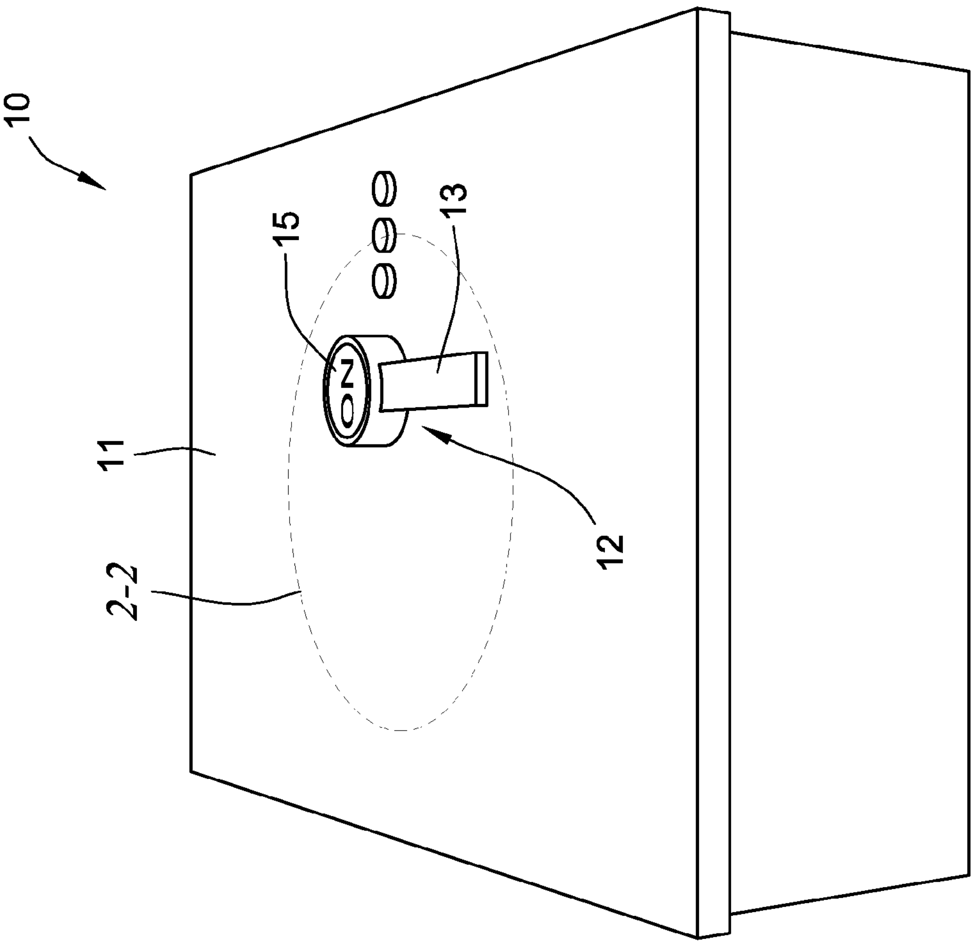
FIG. 1 is a front perspective view of an electrical distribution switch enclosure with a display device according to the present invention integrated into the operating handle of the switch and displaying the ON, or closed, operating status of the enclosed switch contacts.

FIG. 1 is a front perspective view of an apparatus, here being an electrical distribution switch 10 with an enclosure 11 associated with a display device, i.e. signage, 12 according to the present invention integrated into the operating handle 13 of the switch. The handle 13 mechanically operates the electrical contacts 14 (shown in FIG. 5) within the enclosure 11. The handle 13 is in the vertical position, as illustrated, and is displaying the ON, or closed, operating status 15 of the enclosed switch contacts. It will be appreciated that the electrical distribution switch 10 is merely exemplary and any number of types of electrical distribution equipment or other apparatus may be suitable for use with the present invention.

Figure 2:
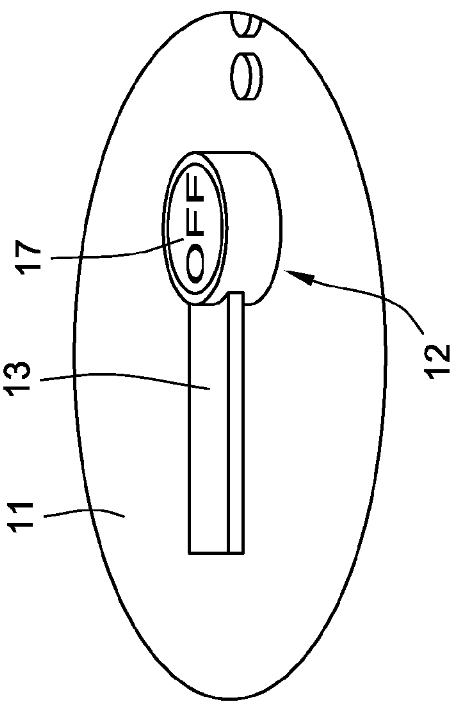
FIG. 2 is a front perspective view of the switch of FIG. 1 but with the operating handle of the switch in the OFF, or open, position and with the display device displaying the appropriate operating status of the enclosed switch contacts.

As seen in FIG. 2, a front perspective view of the electrical distribution switch enclosure 11 of FIG. 1, the operating handle 13 of the switch has been moved to the horizontal OFF position to open the contacts, and the display device 15 according to the present invention now displays the appropriate OFF operating status 17 of the enclosed switch contacts.

Figure 3:
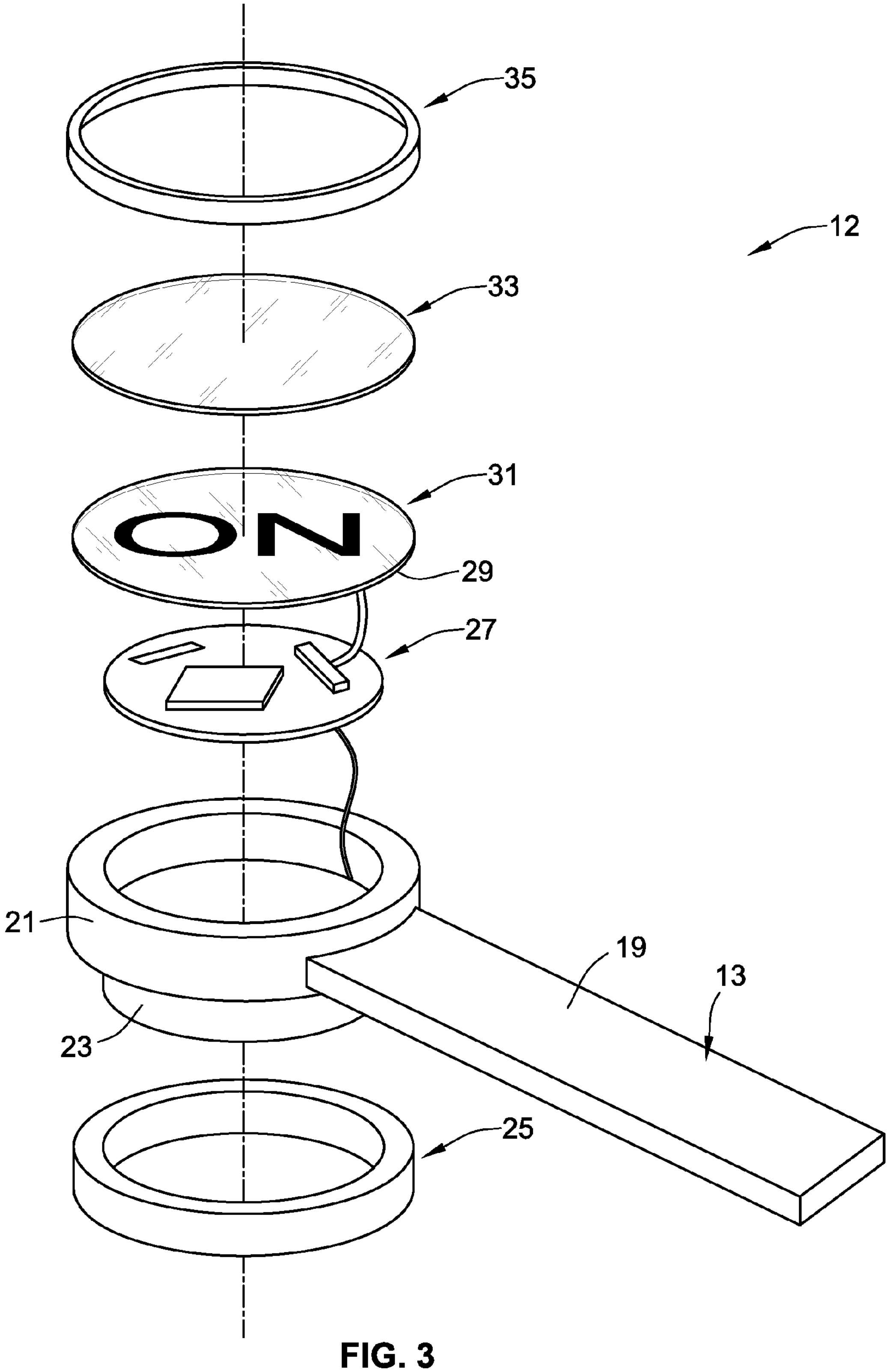
FIG. 3 is an exploded view of the handle of FIGS. 1 and 2 detailing certain aspects of a self-contained and self-powered display device according to aspects of the present invention.

FIG. 3 is an exploded view of the handle 13 and integral display device 12 of FIGS. 1 and 2 detailing certain aspects of a self-contained and self-powered display device according to the present invention. The handle 13 comprises a shaft portion 19 with an annular handle portion 21 at one end. The annular portion 21 has fitted thereto a coil 23 movable as a rotor with the motion of the handle 13. Beneath the rotor coil 23 is an annular magnetic stator 25 into which the rotor 23 is fitted when assembled. Also within the annular handle portion 21 is contained an electronic substrate, here a printed circuit board (PCB) 27, carrying additional electrical devices, such as any necessary amplifiers, drivers, transformers, or the like, to regulate power to a bistable display 31, and electronic devices e.g., components for production or storage of additional display signals, appropriate memory devices, as deemed necessary by the designer, and indicated schematically on the drawing. Overlying and connected to the PCB 27 is the bistable display 31 including any necessary display substrate 29 for changing, i.e. control of, the pixels of the bistable display 31.

A protective transparent cover 33 is then preferably overlaid on the bistable display 31 and a sealing ring 35 is used to hold the cover 33 in place and complete the display device 12. Suitable spacing and provision for mechanical connections of the handle 13 to the drive system for the switch contacts 14 within the enclosure (FIG. 5) is considered within the ordinary skill of the art.

It will be appreciated that the various discrete components of the display device 12 as illustrated may be combined in any convenient fashion, e.g. the bistable display 31 and display substrate 29 may be combined in a single device, such as a so-called electronic paper display.

Thus as the handle 13 is grasped and moved as the actuator to operate the switch contacts of the electrical distribution apparatus 10 the rotor 23 and stator 25 of the display device 12 act as a generator supplying a current to the PCB 27 which can supply the necessary voltages to the display substrate 29 and change the state of the bistable display 31. It will be appreciated by those of skill in the art that movement of a handle, by definition herein meaning something grasped in order to be manipulated, may be in a linear, reciprocal, or rotary motion, and be operable to produce a current from a selected generator. Likewise, should the actuator be a button, by definition herein meaning something pushed in order to be manipulated, it will likely produce a linear or reciprocal initial motion which can directly drive movement of a rotor, or the force may be transferred to a rotary motion with suitable gearing.

Figure 4:
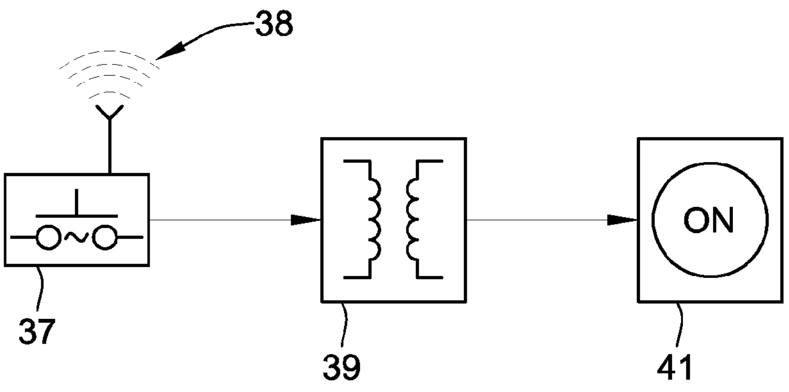
FIG. 4 is a schematic representation of another aspect of the invention wherein a push button is the member enabling a toggle of the bistable display state as well as additional signal generation for remote operation of other equipment functions.

FIG. 4 is a schematic diagram of another aspect of the invention wherein a push button 37 is the member enabling a toggle of the bistable display state as well as additional signal generation for remote wireless operation of equipment function. A commercially available self-powered, transmitting, wireless, batteryless pushbutton switch, such as a HARMONY XB5R available form Schneider Electric USA, Inc. combines a pushbutton actuator mechanism with an on-board, i.e. integral, electrical and signal generator and has been found to generate sufficient power at a pulse of 75 mWatts with 3.3. Volts, in conjunction with a microtransformer 39 such as an "AnyVolt Micro" from Dimension Engineering of Akron Ohio, to be boosted up to the 15 Volts required to run a commercially available bistable display 41 of the electronic paper display type. Signal 38 will be received by a complementary receiver within the equipment (not shown) and acted upon separately.

Figure 5:
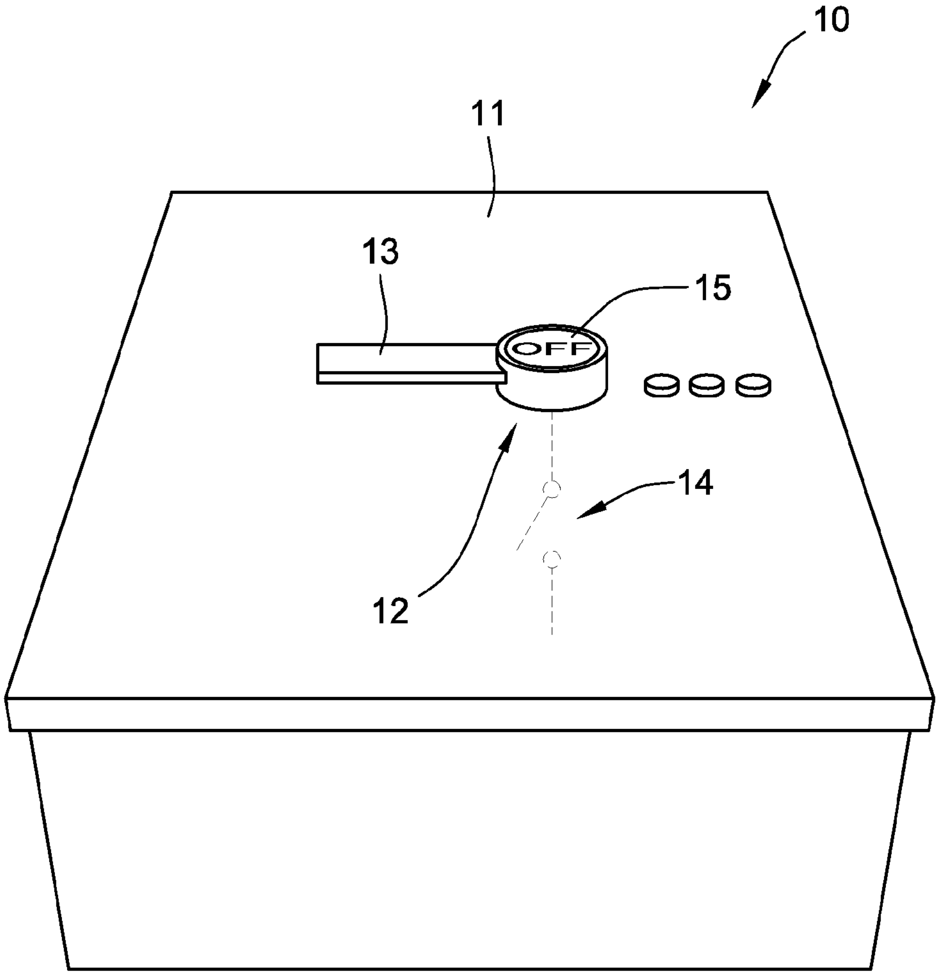
FIG. 5 is a front perspective view similar to FIG. 1 of the electrical distribution switch enclosure with the display device displaying the OFF, or open, status of the enclosed switch contacts.

FIG. 5 is a front perspective view similar to FIG. 1 of the electrical distribution switch 10 with an enclosure 11 associated with a display device, i.e. signage, 12 integrated into the operating handle 13 of the switch 10. The handle 13 mechanically operates the electrical contacts 14, shown in phantom, within the enclosure. The handle 13 is in the horizontal position, as illustrated, and is displaying the OFF, or open, operating status 15 of the enclosed switch contacts 14.

Having thus described a self-contained information display device; it will be appreciated that many variations thereon will occur to the artisan upon an understanding of the present invention, which is therefore to be limited only by the appended claims.

The invention claimed is:

1. A self-contained information display device, comprising:

a bistable display electrically attached to an electrical generator mechanically powered by operation of an actuator for moving a portion of the generator, whereby operation of the mechanically powered generator causes the bistable display to change state.

2. The information display device of claim 1 wherein the actuator of the generator is integral with one of a handle and a button.

3. The information display device of claim 2 wherein the one of a handle or button is integral with the operation of an associated apparatus, and the bistable display indicates a status of the associated apparatus.

4. The information display device of claim 1 wherein the bistable display changes state to give a status of operations of an electrical distribution device.

5. The information display device of claim 1 wherein the actuator is operated manually.

6. The information display device of claim 1 wherein the bistable display includes a display of "OFF" and a display of "ON."

7. The information display device of claim 1 further comprising an electronic substrate carrying components for controlling information of the bistable display.

8. The information display device of claim 1 further comprising a power regulator for the bistable display.

9. The information display device of claim 8 wherein the power regulator is a microtransformer.

10. An actuator for a mechanically controlled apparatus, comprising:

a handle having a shaft portion and an annular handle portion at one end of the shaft portion, a rotor portion of a generator attached to the annular handle portion, and an annular stator for receiving the rotor, whereby the rotor is movable with a motion of the handle.

11. The actuator for a mechanically controlled apparatus according to claim 10, wherein the annular handle portion further contains an electronic substrate within the annular handle portion for carrying electronic components used in production or change of display signals.

12. An electrical distribution device comprising:

an enclosure, a mechanical link from the outside of the enclosure to the inside of the enclosure for operation of a distribution device function, an actuator on the outside of the enclosure attached to the mechanical link, the actuator having integrated therein a bistable display device electrically attached to an electrical generator mechanically powered by operation of the actuator for moving the mechanical link, and whereby operation of the mechanically powered generator causes the bistable display to change state.

* * * * *